T. W. ROUNDS.
Manufacture of Bayonet-Scabbards.
No. 156,649.
Patented Nov. 10, 1874.
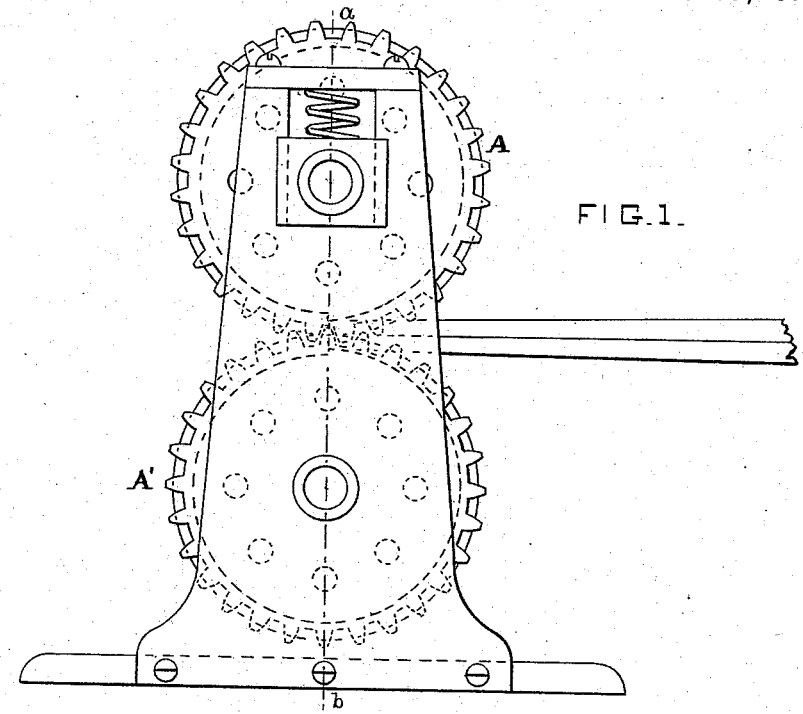
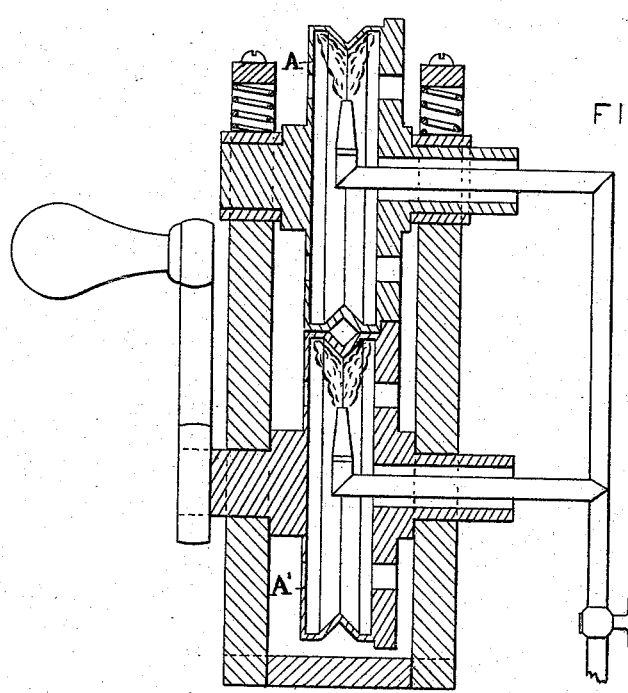
WITNESSES.
INVENTOR.

UNITED STATES PATENT OFFICE.

THOMAS W. ROUNDS, OF PROVIDENCE, RHODE ISLAND, ASSIGNOR OF ONE-HALF HIS RIGHT TO JOHN B. HUMPHREYS, OF SAME PLACE.

IMPROVEMENT IN THE MANUFACTURE OF BAYONET-SCABBARDS.

Specification forming part of Letters Patent No. 156,649, dated November 10, 1874; application filed July 13, 1874.

*To all whom it may concern:*

Be it known that I, THOMAS W. ROUNDS, of the city and county of Providence, in the State of Rhode Island, have invented a new and useful Process of Making Bayonet-Scabbards; and I do hereby declare that the following specification, taken in connection with the drawing making a part of the same, is a full, clear, and exact description thereof.

The object of my invention is to produce a bayonet-scabbard which shall be superior to those now in use in shape and durability, and at the same time may be manufactured with much greater rapidity, and consequently at a less cost, and consists in the process hereinafter described.

In my improved process the leather is cut into suitable shape, chamfered on the edges so as to form an acute angle, and also channeled to conceal the stitching, and is then placed upon a steel former, corresponding to the shape of the bayonet, after having been dipped in a solution composed of gum-tragicum, glue, and water.

The scabbard, being still upon the former, is run through hot rollers A A', constructed in the manner substantially as shown in the accompanying drawing, with an annular groove in each, the combined grooves corresponding to the shape of the scabbard which it is desired to make. The rollers are heated by gas-jets upon the inside, or in and by any other convenient way or means.

The dipping of the leather in the solution mentioned, while it softens and prepares it for the action of the heated rollers in the first instance, eventually hardens, stiffens, and protects it.

The scabbard thus made will be in the exact shape of the bayonet, and of superior finish, while the rapidity with which they can be manufactured, as compared with the processes now in use, materially reduces their cost.

The solution to which I have referred forms no part of the invention, and may be dispensed with, or other solutions for the purpose may be used, not, however, with so satisfactory result.

What I claim as my invention, and desire to secure by Letters Patent, is—

The herein-described process of forming and finishing bayonet-scabbards by passing them while upon a former between heated hollow grooved metallic rollers A A', all substantially as and for the purpose stated.

T. W. ROUNDS.

Witnesses:
    WALTER B. VINCENT,
    J. T. RICH.